United States Patent
Emtman et al.

(10) Patent No.: US 9,267,779 B2
(45) Date of Patent: Feb. 23, 2016

(54) FLEXIBLE MOUNT FOR COUPLING FORCE ACTUATOR TO CALIPER JAW

(71) Applicant: Mitutoyo Corporation, Kanagawa-ken (JP)

(72) Inventors: Casey E. Emtman, Kirkland, WA (US); Michael Edward Goldsworthy, Seattle, WA (US); William Randall Garrity, Bremerton, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 121 days.

(21) Appl. No.: 14/231,492

(22) Filed: Mar. 31, 2014

(65) Prior Publication Data

US 2015/0276366 A1   Oct. 1, 2015

(51) Int. Cl.
*G01B 3/10* (2006.01)
*G01B 3/20* (2006.01)
*G01B 3/00* (2006.01)
*G01B 5/00* (2006.01)
(Continued)

(52) U.S. Cl.
CPC ............... *G01B 3/205* (2013.01); *G01B 3/008* (2013.01); *G01B 3/18* (2013.01); *G01B 3/20* (2013.01); *G01B 3/22* (2013.01); *G01B 5/00* (2013.01); *G01B 5/02* (2013.01); *G01B 5/08* (2013.01); *G01B 5/12* (2013.01); *G01B 5/14* (2013.01); *G01D 5/12* (2013.01)

(58) Field of Classification Search
CPC .............. G01B 5/14; G01B 5/12; G01B 5/00; G01B 5/02; G01B 5/08; G01B 3/22; G01B 3/20; G01B 3/205; G01B 3/18; G01B 3/008; G01D 5/12

USPC ........ 33/701, 542.1, 783, 784, 810, 811, 808, 33/815
See application file for complete search history.

(56) References Cited

U.S. PATENT DOCUMENTS

| | | | |
|---|---|---|---|
| 517,208 A * | 3/1894 | Billings .................... | G01B 3/20 33/810 |
| 2,741,848 A * | 4/1956 | Livingston ............... | G01B 3/20 33/795 |

(Continued)

OTHER PUBLICATIONS

U.S. Appl. No. 13/706,225, filed Dec. 5, 2012, entitled "System and Method for Setting Measurement Force Thresholds in a Force Sensing Caliper," 36 pages.

(Continued)

*Primary Examiner* — Laura Martin
*Assistant Examiner* — Rhyan C Lange
(74) *Attorney, Agent, or Firm* — Seed IP Law Group PLLC (57) ABSTRACT

A flexible mount is provided for coupling a force actuator to a caliper jaw. The flexible mount includes a first mounting portion for being coupled to the caliper jaw, a second mounting portion for being coupled to the force actuator, and a flexible element (e.g., a parallel flexure) coupled between the first and second mounting portions. When a force is applied to the force actuator (e.g., by a user pushing on a thumbwheel) along the measuring axis direction, the flexible element flexes to generate a measuring force that is applied to the caliper jaw. The use of the flexible mount results in more control and a better feel for a user when attempting to exert control to provide a desired amount of force during a measuring process. The flexible mount may also utilize a fastening configuration that is compatible with existing mounting features on existing caliper jaws.

19 Claims, 4 Drawing Sheets

(51) Int. Cl.
*G01B 5/14* (2006.01)
*G01B 5/08* (2006.01)
*G01B 5/12* (2006.01)
*G01B 5/02* (2006.01)
*G01D 5/12* (2006.01)
*G01B 3/22* (2006.01)
*G01B 3/18* (2006.01)

(56) References Cited

U.S. PATENT DOCUMENTS

| | | | | |
|---|---|---|---|---|
| 2,952,916 A | * | 9/1960 | Germann | G01B 3/20 33/811 |
| 3,113,384 A | * | 12/1963 | Keszler | G01B 3/20 33/811 |
| 3,742,609 A | * | 7/1973 | Jeannet | G01B 3/20 33/810 |
| 4,873,771 A | * | 10/1989 | Wust | G01B 3/20 33/802 |
| 5,029,402 A | | 7/1991 | Lazecki et al. | |
| 5,574,381 A | | 11/1996 | Andermo et al. | |
| 5,886,519 A | | 3/1999 | Masreliez et al. | |
| 5,901,458 A | | 5/1999 | Andermo et al. | |
| 5,973,494 A | | 10/1999 | Masreliez et al. | |
| RE37,490 E | | 1/2002 | Andermo et al. | |
| 6,400,138 B1 | | 6/2002 | Andermo | |
| 7,246,032 B2 | | 7/2007 | Feldman | |
| 7,530,177 B1 | | 5/2009 | Meichle et al. | |
| 7,533,474 B2 | | 5/2009 | Saito et al. | |
| 8,205,510 B2 | | 6/2012 | DiLuigi | |
| 8,357,120 B2 | | 1/2013 | Moller et al. | |
| 2003/0047009 A1 | * | 3/2003 | Webb | G01B 3/205 33/784 |
| 2011/0137967 A1 | | 6/2011 | Jansson | |

OTHER PUBLICATIONS

U.S. Appl. No. 14/194,320, filed Feb. 28, 2014, entitled "Displacement Sensor for Force Indicating Caliper," 35 pages.
U.S. Appl. No. 14/194,461, filed Feb. 28, 2014, entitled "Wheel Assembly for Moving Caliper Jaw With Repeatable Force," 34 pages.
U.S. Appl. No. 14/267,666, filed May 1, 2014, entitled "Caliper Force Indicator With Tactile or Auditory Feedback," 41 pages.
U.S. Appl. No. 14/644,079, filed Mar. 10, 2015, entitled "Compliant Thumb Wheel Assembly Coupled to a Caliper Jaw," 55 pages.

* cited by examiner

FLEXIBLE MOUNT FOR COUPLING FORCE ACTUATOR TO CALIPER JAW

BACKGROUND

1. Technical Field

The invention relates generally to precision measurement instruments, and particularly to calipers with a movable jaw for measuring the dimensions of an object.

2. Description of the Related Art

Calipers are known that utilize pairs of jaws for determining measurements. A first jaw is generally fixed at one end of a measurement scale while a second jaw is attached to a slider assembly that moves along the measurement scale. An outer dimension of an object may be measured by arranging the object between and against inner surfaces of the first and second jaws. An inner dimension of an object may be measured by arranging outer surfaces of the first and second jaws between and against the inner surfaces of the object (e.g. the walls of a hole). The slider assembly may be moved with a user's thumb, and a thumb wheel may be provided for enabling controlled movement of the slider. One exemplary caliper utilizing a thumb wheel is described in U.S. Pat. No. 7,533,474, which is hereby incorporated herein by reference in its entirety.

For measuring the distance between the jaws of the caliper, electronic position encoders may be used, based on low-power inductive, capacitive, or magnetic position sensing technology. In general, such an encoder may comprise a readhead and a scale. The readhead may generally comprise a readhead sensor and readhead electronics. The readhead outputs signals that vary as a function of the position of the readhead sensor relative to the scale along a measuring axis. The scale may be affixed to an elongated scale member that includes a fixed first measuring jaw. The readhead is affixed to a slider assembly including the second measuring jaw, which is movable along the scale member. Measurements of the distance between the two measuring jaws may be determined based on the signals from the readhead. Exemplary electronic calipers are disclosed in commonly assigned U.S. Pat. Nos. RE37490, 5,574,381, and 5,973,494, each of which is hereby incorporated by reference in its entirety. A prior art electronic caliper that is capable of measuring force is disclosed in U.S. Patent Publication No. 2003/0047009. As described in the '009 publication, one deficiency in the use of prior calipers is the variation in force which can be applied by the measuring jaws and the differences in measurement which can occur as a result. Particularly when a soft object is being measured, the measurement of the object may be unreliable or non-repeatable because one may apply either a higher force on the jaws of the caliper such that the soft object is "more compressed", or apply a lower force such that the soft object is "less compressed". The '009 publication discloses a caliper that is capable of measuring both the size and force applied to an object, which may be analyzed to provide more repeatable measurements. However, the force sensing and indicating features of the caliper of the '009 publication may be considered "overkill" in many applications, and/or may be considered too expensive and/or complex by many caliper users. A need exists for improving measurement force control and/or repeatability in a caliper in an economical, ergonomically convenient, repeatable, and intuitively understandable manner.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A flexible mount is provided for coupling a force actuator to a caliper jaw that moves along a caliper scale member along a measuring axis direction. The flexible mount includes a first mounting portion for being coupled to the caliper jaw, a second mounting portion for being coupled to the force actuator, and a flexible element coupled between the first and second mounting portions. The flexible mount is configured such that when it is coupled to the caliper jaw and the force actuator, the force actuator is suspended to move with the caliper jaw along the caliper scale member and is restrained from displacement relative to the caliper jaw along directions transverse to the measuring axis direction. In addition, when a force is applied to the force actuator along the measuring axis direction, the flexible element flexes such that the force actuator displaces along the measuring axis direction relative to the caliper jaw, and generates a measuring force that depends on that relative displacement and is applied to the caliper jaw along the measuring axis direction. In this manner, the flexible mount performs a dual function of providing both a resistance force and serving as a guiding mechanism for the force actuator. In various implementations, the use of the flexible mount may result in more control and a better "feel" for a user when attempting to exert control to provide a desired amount of force during a measuring process. In addition, in various implementations use of the flexible mount may reduce the number of parts required and may feel more integrated with the slider of the caliper than other known force actuator coupling configurations.

In various implementations, the flexible element is configured for bi-directional elastic coupling of the force actuator to the caliper jaw. In one such implementation, force that is applied to the force actuator in a first direction along the measuring axis direction generates a first polarity deformation of the flexible element which generates a first polarity measuring force applied to the caliper jaw. In addition, force applied to the force actuator in a second direction along the measuring axis direction generates a second polarity deformation of the flexible element which generates a second polarity measuring force applied to the caliper jaw.

In various implementations, the flexible element comprises parallel spring elements that bend primarily in a plane parallel to the measuring axis direction. In one specific example implementation, steel shims may be utilized for the parallel spring elements. In other implementations, other material types (e.g., a resilient polymer material) may be used to provide the flexible element, which may be formed as a combination of parts or elements (e.g., a stamped metal flexure molded into a polymer part) or as a single element (e.g., a single molded part) to reduce the parts count and assembly cost. In one implementation, a compound flexure may be utilized for the flexible element with a resulting increase in the available flex range. In various implementations, the materials and configuration of the flexible mount may be selected such that a relative displacement of at least 0.5 mm and at most 5.0 mm corresponds to a related change in the measuring force of at least 0.1 newtons and at most 10 newtons.

In various implementations, a displacement indicator may be included that is responsive to a deformation comprising at least one of the flexing of the flexible element and the relative displacement of the force actuator. The response of the displacement indicator is generally intended to be indicative of the measuring force. In various implementations, the displacement indicator may comprise at least one of a visual indicator responsive to the deformation, a tactile sensation generator that provides at least one respective tactile sensation corresponding to the deformation, and a sound generator that provides at least one respective sound corresponding to the deformation.

In various implementations, a stop arrangement may be included that is configured to provide a maximum relative displacement limit between the force actuator and the caliper jaw along the measuring axis direction. In this manner, the deformation of the flexible element may be limited to substantially exclude plastic deformation of the flexible element. The stop arrangement may further be configured to transmit additional force between the force actuator and the caliper jaw once the maximum relative displacement limit is reached.

In various implementations, the flexible mount is configured to mount the force actuator to the caliper jaw of existing calipers using a fastening configuration that is compatible with existing mounting features on a caliper jaw. In instances where the existing calipers do not include a force actuator, the flexible mount may be utilized for retrofitting a force actuator to the existing calipers.

In various implementations, the flexible mount is included with a set of interchangeable flexible mounts, wherein each flexible mount in the set provides a different spring rate. In this manner, a different spring rate for a specific measuring application may be achieved by de-coupling a first flexible mount from the caliper jaw and coupling a second flexible mount with a different desired spring rate to the caliper jaw.

DETAILED DESCRIPTION

Figure 1:
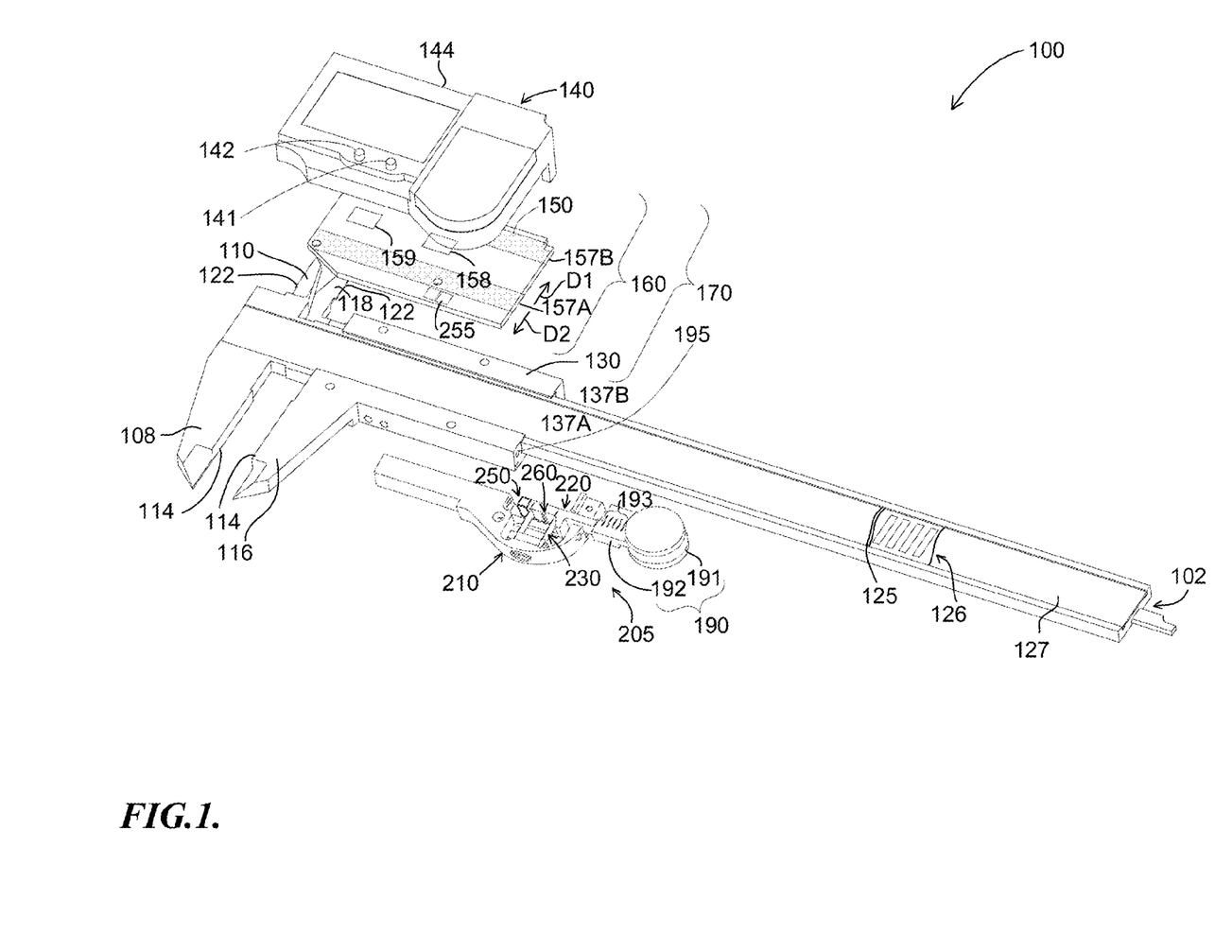
FIG. 1 is an exploded isometric view diagram of a hand tool type caliper including a scale and slider with a flexible mount for coupling a force actuator to a caliper jaw.

FIG. 1 is an exploded isometric view diagram of a hand tool type caliper 100 with a flexible mount 205 for coupling a force actuator assembly 190 to a slider 130 with caliper jaws 116 and 118. In this example, the caliper 100 comprises a slider displacement sensor 158 (e.g., a magnetic or inductive sensor assembly) and a scale substrate 125 including a scale track 126 (a cut-away segment of each is illustrated) positioned in a groove 127 along an elongated scale member 102. It will be appreciated that in other embodiments other types of slider displacement sensors 158 may be utilized (e.g., capacitive, etc.) A slider assembly 170 includes an electronic assembly 160 attached to a slider 130. The slider displacement sensor 158 is included in the electronic assembly 160. The general mechanical structure and physical operation of the caliper 100 is similar to that of certain prior electronic calipers, such as that of commonly assigned U.S. Pat. No. 5,901,458, which is hereby incorporated herein by reference in its entirety. The scale member 102 is a rigid or semi-rigid bar which may include various grooves and/or other features incorporated into a generally rectangular cross section. The scale substrate 125 may be rigidly bonded in the groove 127, and the scale track 126 may include scale elements that cooperate with corresponding elements (not shown) of the slider displacement sensor 158 included in the electronic assembly 160, in a manner similar to that used in known electronic calipers and as described in the previously incorporated U.S. Pat. Nos. RE37,490 and 5,901,458 patents, and in commonly assigned U.S. Pat. No. 6,400,138, which is incorporated herein by reference in its entirety.

A pair of jaws 108 and 110 are integrally formed near a first end of the scale member 102. A corresponding pair of jaws 116 and 118 are formed on the slider 130. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes referenced as the zero position, the engagement surfaces 114 abut one another, the engagement surfaces 122 are aligned, and both the outside and inside dimensions measured by the caliper 100 may be indicated as zero.

The measured dimension may be displayed on a digital display 144, which is mounted within a cover 140 of the electronic assembly 160 of the caliper 100. The electronic assembly 160 may also include a push button switch 141 (e.g., an "origin" switch), a force status indicator 142 (e.g., a two or three color light), and a signal processing and display circuit board 150. Force threshold setting operations are described in more detail in co-pending and commonly assigned U.S. patent application Ser. No. 13/706,225 (hereinafter the "'225 application"), titled "System and Method for Setting Measurement Force Thresholds in a Force Sensing Caliper", filed Dec. 5, 2012, which is hereby incorporated by reference in its entirety. As described in the '225 application, the push button switch 141 may in one implementation be utilized as part of a process for setting force thresholds, and the force status indicator 142 may be utilized for providing force threshold signals (e.g., "green" when the force is within a desired measuring range, and "red" when the force has exceeded the desired measuring range.) The signal processing and display circuit board 150 may comprise a read head signal processing and control circuit 159. As shown in FIG. 1, the bottom surface of the signal processing and display circuit board 150 may be mounted to abut the top surfaces of the slider 130 on either side of the scale member 102.

A force element displacement sensor includes an arrangement of displacement signal elements 255 and a signal modulating element 250 that is coupled to the force actuator assembly 190. A similar force element displacement sensor is described in more detail in co-pending and commonly assigned U.S. patent application Ser. No. 14/194,320 (hereinafter the "'320 application"), titled "Displacement Sensor For Force Indicating Caliper", filed Feb. 28, 2014, which is hereby incorporated by reference in its entirety. In general, in one implementation the arrangement of displacement signal elements 255 is fabricated in one or more metal layers of the circuit board 150 and produces electrical signals that are indicative of the position of the signal modulating element 250. The read head signal processing and control circuit 159 includes a force sensing circuit which receives the force sensing signals from the arrangement of displacement signal elements 255 for determining force measurements. As a user pushes on the thumb wheel 191 so as to move the slider 130 toward the first end of the scale member 102, the force actuator assembly 190 and attached signal modulating element 250 are pushed forward so as to move in a guided fashion along the caliper measuring axis direction relative to the arrangement of displacement signal elements 255. The signal modulating element 250 is arranged with a relatively small gap proximate to the displacement signal elements 255 such that they sense its relative position along the measuring axis direction. As will be described in more detail below, the position of the signal modulating element 250 corresponds to the amount of flex of a flexible element 230 of the flexible mount 205, and is therefore indicative of the corresponding measuring force. As will also be described in more detail below, a mechanical force indicator 260 may also or alternatively be provided that provides feedback (e.g., visual, tactile, audible, etc.) regarding the amount of flex of the flexible element 230, which is indicative of the corresponding measuring force.

In various implementations, the circuit board 150 may abut the slider 130 at one or more mounting regions of the circuit board 150. More specifically, as shown in FIG. 1, the circuit board 150 has mounting regions 157A and 157B which abut corresponding mounting regions 137A and 137B on the slider 130. In addition, a conductive signal sensing element (not shown) of the slider displacement sensor 158 may overlap the scale member 102 in a scale track 126 located in a first lateral direction D1 away from the mounting region 157A. Furthermore, at least one conductive signal sensing element of the arrangement of displacement signal elements 255 may be arranged in a region located in an opposite lateral direction D2 away from the mounting region 157A. It will be appreciated that in this configuration, the metal slider 130 may, in addition to its usual slider functions, also act to shield simultaneous signals for the slider displacement sensor 158 and the force element displacement sensor 255 from one another.

The flexible mount 205 includes a jaw mounting portion 210, an actuator mounting portion 220 and the flexible element 230. The jaw mounting portion 210 is coupled to the slider 130 and the corresponding jaws 116 and 118. The actuator mounting portion 220 is coupled to the actuator assembly 190. The flexible element 230 is coupled between the jaw mounting portion 210 and the actuator mounting portion 220.

In various implementations, the flexible element 230 may consist of parallel spring elements, as will be described in more detail below with respect to FIG. 2. The parallel spring elements may be relatively rigid and correspondingly act to restrain the force actuator assembly 190 from displacement relative to the caliper jaw along directions transverse to the measuring axis direction. In this manner, the flexible element 230 may act as both a guiding mechanism for the force actuator assembly 190, as well as providing a resistance force, as will be described in more detail below.

In operation, as a user pushes on the thumb wheel 191 of the force actuator assembly 190 so as to move the slider 130 toward the first end of the scale member 102, the flexible element 230 flexes such that a force actuator body 192 of the force actuator assembly 190 displaces along the measuring axis direction relative to the slider 130 and corresponding caliper jaws 116 and 118. This action generates a measuring force that depends on the relative displacement and is applied to the slider 130 and corresponding caliper jaws 116 and 118 along the measuring axis direction. As will be described in more detail below, the utilization of the flexible mount 205 with the flexible element 230 allows a gradual increase or decrease in force to occur over a range of positions. Importantly, this results in more control and a better "feel" for a user when attempting to exert control to provide a desired amount of force during a measuring process. In addition, in various implementations the use of the flexible element 230 may reduce the number of parts required, and may feel more integrated with the slider 130.

Figure 2:
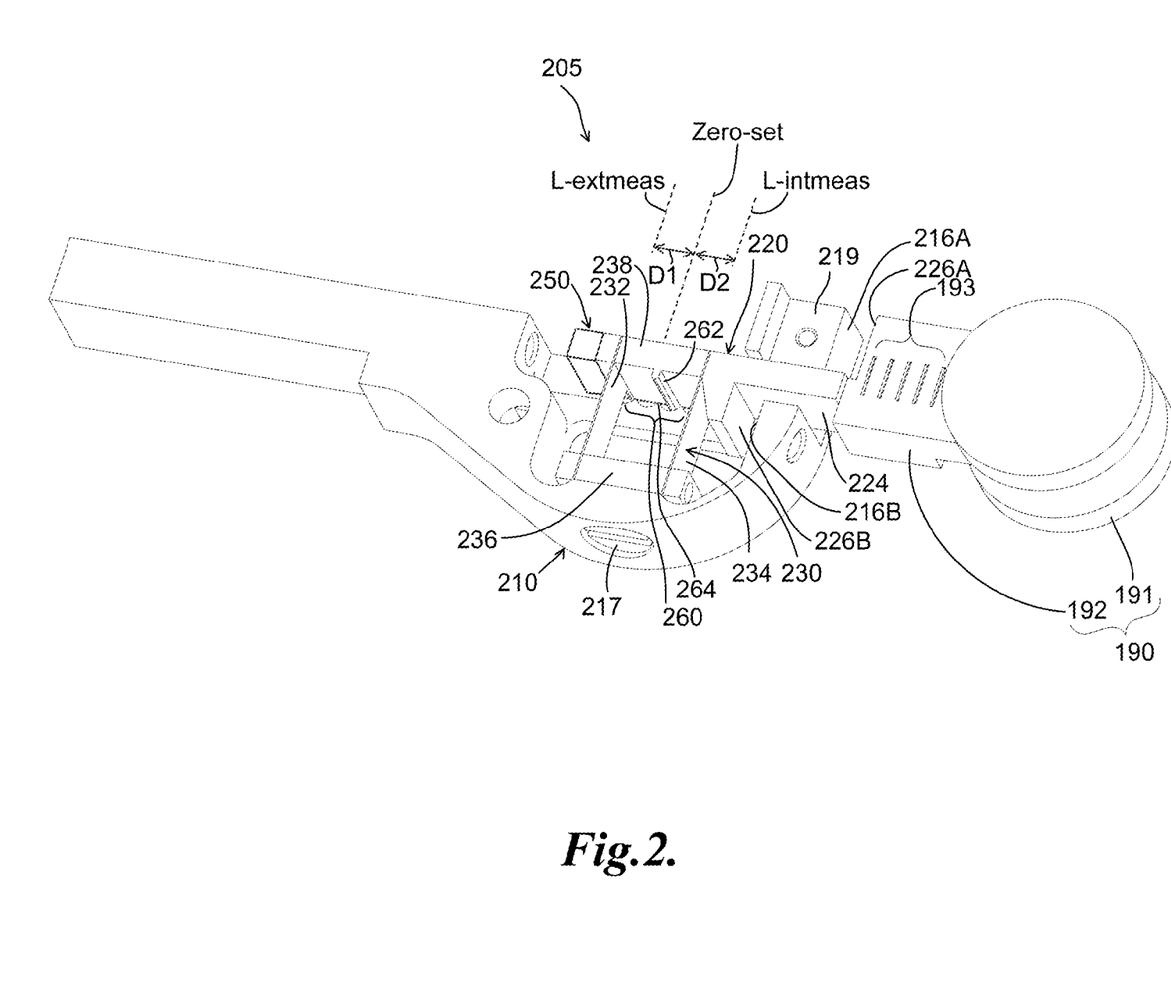
FIG. 2 is an isometric view diagram of the flexible mount and force actuator of FIG. 1.
Figure 3:
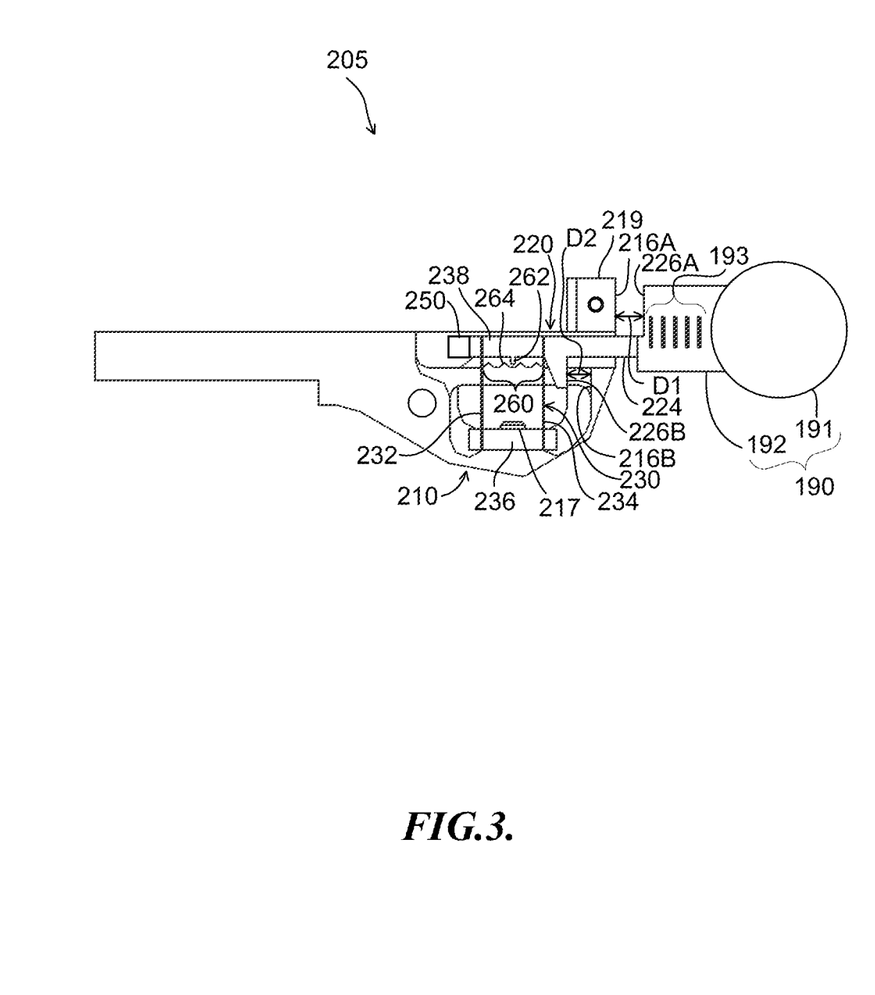
FIG. 3 is a top view diagram of the flexible mount and force actuator of FIG. 1.

FIG. 2 is an isometric view diagram and FIG. 3 is a top view diagram of the flexible mount 205 and force actuator assembly 190 of FIG. 1. As shown in FIGS. 2 and 3, the flexible element 230 includes a first spring element 232, a second spring element 234, a first flexible element coupling portion 236 and a second flexible element coupling portion 238. As will be described in more detail below, the first flexible element coupling portion 236 is coupled to the jaw mounting portion 210, and the second flexible element coupling portion 238 is coupled to the actuator mounting portion 220. The first and second spring elements 232 and 234 are oriented in parallel and may function as a parallelogram spring suspension.

As shown in FIGS. 2 and 3, the jaw mounting portion 210 is coupled to the first flexible element coupling portion 236 utilizing a fastener 217 (e.g. the fastener 217 may act as a screw and the coupling portion 236 may act as a nut). The jaw mounting portion 210 includes an attachment portion 219 for being attached to the slider 130. In general, the sliders and associated jaws of certain existing calipers have specified dimensions, surfaces and features to which external elements may be mounted, and in various implementations the jaw mounting portion 210 is configured for being mounted utilizing a fastening configuration that is compatible with the existing mounting features on the sliders and associated caliper jaws. In addition, certain existing calipers may not include a force actuator assembly 190, in which case the force actuator assembly 190 may be retrofitted to the existing calipers utilizing the flexible mount 205.

The second flexible element coupling portion 238 is coupled to an actuator body coupling element 224 which is coupled to the actuator body 192. The signal modulating element 250 is attached so as to move with the second flexible element coupling portion 238 and the actuator body coupling element 224. While for purposes of illustration the signal modulating element 250 is shown as being located relatively close to the flexible element 230, in other implementations the signal modulating element 250 may be mounted so as to be spaced at a further distance if the flexible element 230 is made of a material that would interfere with the signals of the displacement signal elements 255. Alternatively or in addition, the signal processing for the displacement signal elements 255 may be calibrated or otherwise modified to address issues such as any interference from the flexible element 230 and/or any errors that could otherwise result from the slightly curved movement of the end of the flexible element 230.

As described above, in addition to the electronic force sensing arrangement that utilizes the signal modulating element 250, a mechanical force indicator 260 may also be provided. One specific example implementation, the force indicator 260 may include an indicator element 262 that is mounted on the second flexible element coupling portion 238 so as to move with the force actuator assembly 190, and a range of increment elements 264 on the jaw mounting portion 210. In operation, as the flexible element 230 flexes so as to allow the actuator assembly 190 to move relative to the jaw mounting portion 210, the indicator element 262 moves relative to the range of increment elements 264, so as to provide an indication of the measurement force. In one implementation, the increment elements 264 may include visual indicators (e.g. markings) which provide an indication of the measurement force according to the position of the indicator element 262. In another implementation, the indicator element 262 may produce a tactile or audible indication (e.g. a click) as it is moved along the range of increment elements 264. For example, the indicator element 262 may comprise a metal fin, and the increment elements 264 may comprise a series of raised portions along the range, such that the indicator element 262 "clicks" as it is moved over each of the indicator elements 264. In various implementations, different ranges of increment elements 264 may be provided. For example, in one implementation two increment elements 264 may be provided on either side of a zero-set position, so as to correspond to an acceptable measuring force at a single click, and an excessive measuring force at two clicks.

Alternatively or in addition to the force indicator 260, a visual force indicator may also be provided on the force actuator body 192. In one implementation, the visual force indicator may include a range of markings 193 on the force actuator body 192. In operation, similar to as described above for the force indicator 260, as the thumbwheel 191 is moved by a user, the force actuator body 192 may move and the corresponding markings 193 may move relative to a reference indicator (e.g., at the edge of the cover 140 of the electronic assembly 160) so as to provide an indication of the measurement force.

In one example configuration, the general operation of the caliper 100 and the flexible mount 205 may be described as follows. The caliper may begin at a position zero-set, as illustrated in FIG. 2. At the position zero-set, the caliper is generally in the middle of a bi-directional measurement range, where the flexible element 230 (e.g., a parallelogram spring suspension) is not flexed. At the position zero-set, the signal modulating element 250 may be approximately in the middle of the range of the arrangement of displacement signal elements 255, and the indicator element 262 may be approximately in the middle of the range of increment elements 264.

When a user pushes on the thumb wheel 191 so as to move the slider 130 toward the first end of the scale member of the caliper 100, the flexible element 230 flexes forward, and a limit position L-extmeas may be reached. The limit position L-extmeas may correspond to an external measurement force limit (e.g., for measuring the external dimensions of a workpiece). In various implementations, a stop arrangement may also correspond to the limit position L-extmeas. For example, a surface 226A of the actuator mounting portion 220 may contact a surface 216A of the jaw mounting portion 210 and prevent further flexing of the flexible element 230 in the forward direction. This may also or alternatively correspond to the signal modulating element 250 reaching a first end of the sensing range of the displacement signal elements 255 and/or the indicator element 262 reaching a first end of the range of increment elements 264.

Similarly, when the thumb wheel 191 is moved by a user in the opposite direction, (i.e., so as to reverse the direction of the slider 130 toward the opposite end of the scale member of the caliper 100), the flexible element 230 flexes backward. In this direction, a limit position I-intmeas may be reached which may correspond to an internal measurement limit (e.g., for measuring the internal dimensions of a workpiece). A corresponding stop arrangement may include a surface 226B of the actuator mounting portion 220 which may contact a surface 216B of the jaw mounting portion 210 and prevent further flexing of the flexible element 230 in the reverse direction. This may also or alternatively correspond to the signal modulating element 250 reaching a second end of the sensing range of the displacement signal elements 255 and/or the indicator element 262 reaching a second end of the range of increment elements 264.

It will be appreciated that the surfaces 216A and 226A and the surfaces 216B and 226B form stop arrangements configured to provide a maximum relative displacement limit between the force actuator assembly 190 and the slider 130 with the associated caliper jaws 116 and 118 along the measuring axis direction. When the caliper 100 is in the zero-set position, the surfaces 216A and 226A are separated by a distance D1, while the surfaces 216B and 226B are separated by a distance D2. These distances D1 and D2 thus correspond to the differences from the position zero-set to the limit positions L-extmeas and I-intmeas, respectively. Once these limit positions L-extmeas and I-intmeas are reached, the contact by the corresponding surfaces 216A, 226A and 216B, 226B is configured to transmit any additional force applied by the user on the force actuator assembly 190 directly to the slider 130 rather than further deforming the flexible element 230. In various implementations, one of the purposes of these stop arrangements and the corresponding limit positions L-extmeas and I-intmeas is to limit the deformation of the flexible element 230 to substantially exclude plastic deformation of the flexible element 230.

In one specific example implementation, when the position of the signal modulating element 250 is sensed by the arrangement of displacement signal elements 255 as having reached a location corresponding to the limit positions L-extmeas or I-intmeas, the read head signal processing and control circuit 159 may activate the "red" or "out of range" force status indicator (light) 142. During normal operation, the read head signal processing and control circuit 159 may be configured to generally sense the position of the signal modulating element 250 and convert the position to force measurements. The resulting force measurements may in various implementations be presented to a user in a variety of formats (e.g., as force readings on the display, as various other types of indictors when force limits are reached, etc.)

In various implementations, different features and materials for the flexible element 230 may be utilized in accordance with the desired characteristics of the particular implementation. In general, it is desirable for the flexible element 230 to be rigid enough to provide a reasonable resistance force (e.g., 0.1 to 10 N) while being compliant enough to give a reasonable amount of deflection (e.g., 0.5 to 5 mm). With regard to such embodiments and/or the embodiment of FIG. 2, in certain specific implementations it has been experimentally determined that it may be desirable to use a flexible element 230 that has a spring rate rating of 0.25 N/mm to 6 N/mm, in order to provide certain ergonomic characteristics. It should be appreciated that while applying a controlled force when using a caliper, generally some fingers of a hand grip the caliper scale (thus fixing most of the hand relative to the caliper), a finger may also wrap around the slider, and a thumb may move relative to the hand to adjust the force actuator relative to the slider. Thus, the convenient amount of thumb travel is limited, relative to the remainder of the hand. In general, the 0.25 N/mm limit ensures that a useful amount of force variation may be provided within a convenient and comfortable amount of thumb travel relative to the remainder of the hand, while the upper limit of 6 N/mm ensures that the force variation with a small motion of the thumb is not so great that the user finds it too sensitive for easy and stable control, even for workpieces which may deflect and/or creep under a measurement force. In other words, it has been experimentally determined that this spring rate range provides a user with a desirable measurement feel. In various embodiments, the signal modulating element 250 and the arrangement of displacement signal elements 255, as well as the force indicator 260, may be sized accordingly. It will be appreciated that through the use of levers or gears or other known machine elements, the relationship between finger displacement and force may be changed such that other springs rates (e.g., in the range of 0.05 to 20 N/mm) may be used in other embodiments.

In one specific example implementation, steel shims may be utilized for the first and second spring elements 232 and 234 of the flexible element 230 in order to achieve a desired spring rate. In other implementations, other material types (e.g., a resilient polymer material) may be used to provide the flexible element 230, which may be formed as a combination of parts or elements (e.g., a stamped metal flexure molded into a polymer part) or as a single element (e.g., a single molded part) to reduce the parts count and assembly cost. In one implementation, a compound flexure may be utilized for the flexible element 230 with a resulting increase in the available flex range.

Figure 4A:
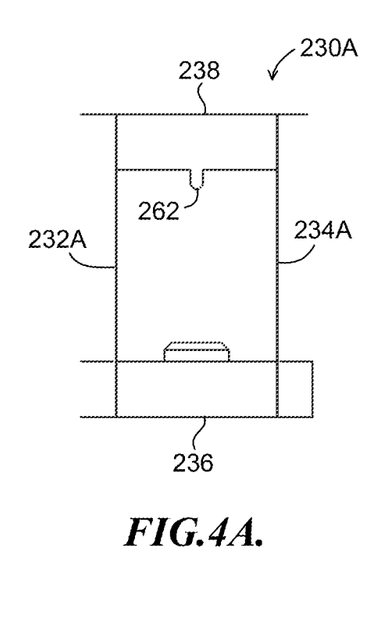
FIGS. 4A-4C are top view diagrams of a set of flexible elements with parallel spring elements of different thicknesses.
Figure 4B:
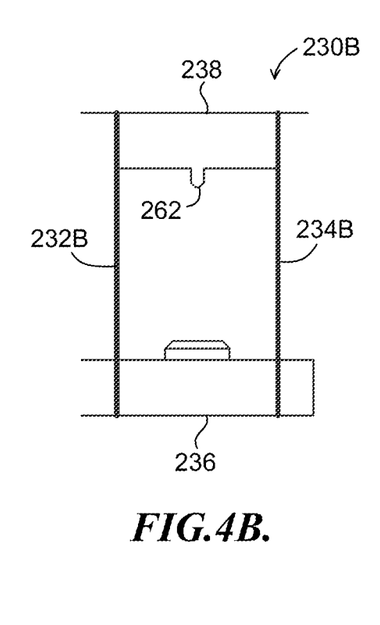
Figure 4C:
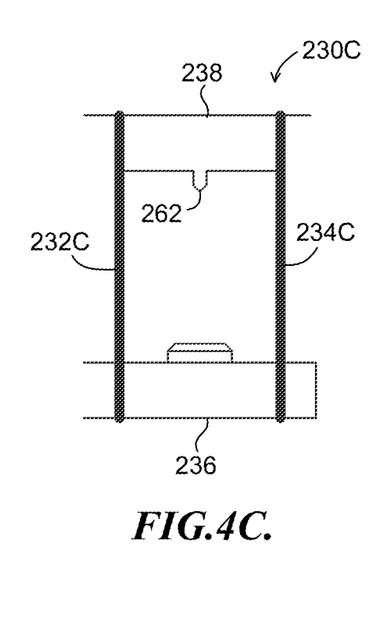

FIGS. 4A-4C are diagrams of a set of flexible elements 230A-230C with parallel spring elements of different thicknesses. As shown in FIG. 4A, the flexible element 230A includes first and second spring elements 232A and 234A that are thinner than the first and second spring elements 232B and 234B of the flexible element 230B of FIG. 4B. Similarly, the first and second spring elements 232B and 234B are thinner than the first and second spring elements 232C and 234C of the flexible element 230C. The different thicknesses of the first and second spring elements of each of the flexible elements 230A, 230B and 230C correspond to different spring rates.

As described above, in various implementations flexible mounts with the corresponding flexible elements 230A-230C may be configured for attachment to existing calipers utilizing a fastening configuration that is compatible with existing mounting features on the caliper jaw and slider. By providing a set of flexible mounts with the flexible elements 230A-230C, a user may select a flexible mount with a spring rate that is appropriate for a specific application. In an alternative implementation, rather than changing the thickness of the first and second spring elements 232 and 234, other dimensions (e.g., the height) of the flexible element 230 may instead be changed. However, in certain implementations it may be less desirable to alter the height of the flexible element 230, in that shorter spring elements 232 and 234 may be more prone to plastic deformation for a given flex displacement. Thus, for a given design configuration, it may be desirable to utilize the maximum available height for the first and second spring elements 232 and 234, and to keep that height relatively constant, while other parameters may be adjusted (e.g. the thickness of the first and second spring elements 232 and 234), as illustrated by the examples of the flexible elements 230A-230C.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A flexible mount for coupling a force actuator to a caliper jaw that moves along a caliper scale member along a measuring axis direction in a caliper, the flexible mount comprising:
a first mounting portion for being coupled to the caliper jaw;
a second mounting portion for being coupled to the force actuator; and
a flexible element coupled between the first and second mounting portions,
wherein the flexible mount is configured such that when it is coupled to the caliper jaw and the force actuator:
the force actuator is suspended to move with the caliper jaw along the caliper scale member and is restrained from displacement relative to the caliper jaw along directions transverse to the measuring axis direction; and
when a force is applied to the force actuator along the measuring axis direction, the flexible element flexes such that the force actuator displaces along the measuring axis direction relative to the caliper jaw, and generates a measuring force that depends on that relative displacement and is applied to the caliper jaw along the measuring axis direction; and
wherein the flexible mount is included with a set of interchangeable flexible mounts, wherein each flexible mount in the set provides a different spring rate.

2. The flexible mount of claim 1, wherein the flexible element comprises parallel spring elements that bend primarily in a plane parallel to the measuring axis direction.

3. The flexible mount of claim 1, wherein:
the flexible element is configured for bi-directional elastic coupling of the force actuator to the caliper jaw, such that force applied to the force actuator in a first direction along the measuring axis direction generates a first polarity deformation of the flexible element which generates a first polarity measuring force applied to the caliper jaw, and force applied to the force actuator in a second direction along the measuring axis direction generates a second polarity deformation of the flexible element which generates a second polarity measuring force applied to the caliper jaw.

4. The flexible mount of claim 1, further comprising a displacement indicator that is responsive to a deformation comprising at least one of the flexing of the flexible element and the relative displacement of the force actuator.

5. The flexible mount of claim 4, wherein the response of the displacement indicator is indicative of the measuring force.

6. The flexible mount of claim 4, wherein the displacement indicator comprises at least one of a visual indicator responsive to the deformation, a tactile sensation generator that provides at least one respective tactile sensation corresponding to the deformation, and a sound generator that provides at least one respective sound corresponding to the deformation.

7. A flexible mount for coupling a force actuator to a caliper jaw that moves along a caliper scale member along a measuring axis direction in a caliper, the flexible mount comprising:
a first mounting portion for being coupled to the caliper jaw;
a second mounting portion for being coupled to the force actuator; and
a flexible element coupled between the first and second mounting portions,
wherein the flexible mount is configured such that when it is coupled to the caliper jaw and the force actuator:
the force actuator is suspended to move with the caliper jaw along the caliper scale member and is restrained from displacement relative to the caliper jaw along directions transverse to the measuring axis direction; and
when a force is applied to the force actuator along the measuring axis direction, the flexible element flexes such that the force actuator displaces along the measuring axis direction relative to the caliper jaw, and generates a measuring force that depends on that relative displacement and is applied to the caliper jaw along the measuring axis direction, and wherein the flexible mount is configured to mount the force actuator to the caliper jaw of existing calipers using a fastening configuration that is compatible with existing mounting features on the caliper jaw.

8. The flexible mount of claim 7, further comprising a stop arrangement configured to provide a maximum relative displacement limit between the force actuator and the caliper jaw along the measuring axis direction, such that deformation of the flexible element is limited to substantially exclude plastic deformation of the flexible element.

9. The flexible mount of claim 8, wherein the stop arrangement is configured to transmit additional force between the force actuator and the caliper jaw once the maximum relative displacement limit is reached.

10. The flexible mount of claim 7, wherein the flexible mount is configured such that a relative displacement of at least 0.5 mm and at most 5.0 mm corresponds to a related change in the measuring force of at least 0.1 newtons and at most 10 newtons.

11. The flexible mount of claim 7, wherein the existing calipers do not include a force actuator and the force actuator is retrofitted to the existing calipers using the flexible mount.

12. The flexible mount of claim 11, further comprising a displacement indicator that is responsive to a deformation comprising at least one of the flexing of the flexible element and the relative displacement of the force actuator.

13. The flexible mount of claim 12, wherein the displacement indicator comprises at least one of a visual indicator responsive to the deformation, a tactile sensation generator that provides at least one respective tactile sensation corresponding to the deformation, and a sound generator that provides at least one respective sound corresponding to the deformation.

14. The flexible mount of claim 7, wherein the flexible mount is included with a set of interchangeable flexible mounts, wherein each flexible mount in the set provides a different spring rate.

15. A method for retrofitting an existing caliper with a flexible mount, the existing caliper including a caliper jaw that moves along a caliper scale member along a measuring axis direction in the caliper, the method comprising:

providing a flexible mount comprising:
    a first mounting portion for being coupled to the caliper jaw;
    a second mounting portion for being coupled to a force actuator; and
    a flexible element coupled between the first and second mounting portions, and
coupling the first mounting portion to the caliper jaw using a fastening configuration that is compatible with existing mounting features on the caliper jaw;
wherein the flexible mount is configured such that when it is coupled to the caliper jaw and the force actuator:
    the force actuator is suspended to move with the caliper jaw along the caliper scale member and is restrained from displacement relative to the caliper jaw along directions transverse to the measuring axis direction; and
    when a force is applied to the force actuator along the measuring axis direction, the flexible element flexes such that the force actuator displaces along the measuring axis direction relative to the caliper jaw, and generates a measuring force that depends on that relative displacement and is applied to the caliper jaw along the measuring axis direction, and
wherein the existing caliper does not include a force actuator and the force actuator is retrofitted to the existing caliper using the flexible mount.

16. The method of claim 15, further comprising providing a displacement indicator that is responsive to a deformation comprising at least one of the flexing of the flexible member and the relative displacement of the force actuator.

17. The method of claim 16, wherein the displacement indicator comprises at least one of a visual indicator responsive to the deformation, a tactile sensation generator that provides at least one respective tactile sensation corresponding to the deformation, and a sound generator that provides at least one respective sound corresponding to the deformation.

18. The method of claim 15, wherein the flexible element comprises parallel spring elements that bend primarily in a plane parallel to the measuring axis direction.

19. The method of claim 15, further comprising achieving a different spring rate for the force actuator relative displacement by de-coupling the flexible mount from the caliper jaw and coupling a different flexible mount with a different spring rate to the caliper jaw.

* * * * *